J. INGELS.
Grain Drill.
No. 107,915. Patented Oct. 4, 1870.
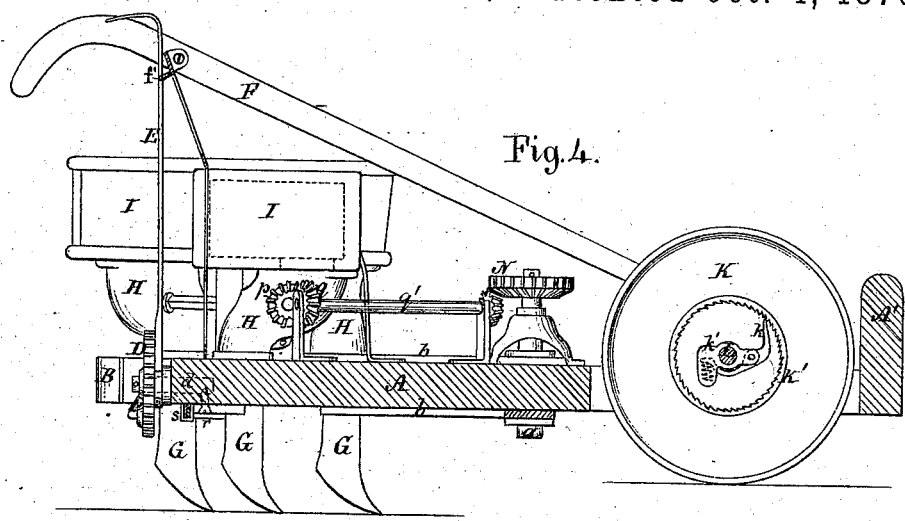
Fig. 4.
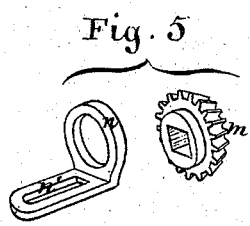
Fig. 5.
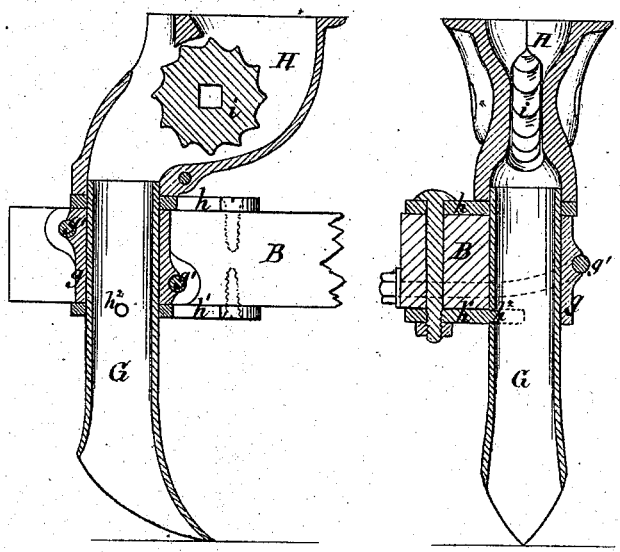
Fig. 6.　　Fig. 7.
Fig. 8.
Witnesses
Henry Nillygat
Edmund Masson
Joseph Ingels.
By atty A. P. Stoughton.

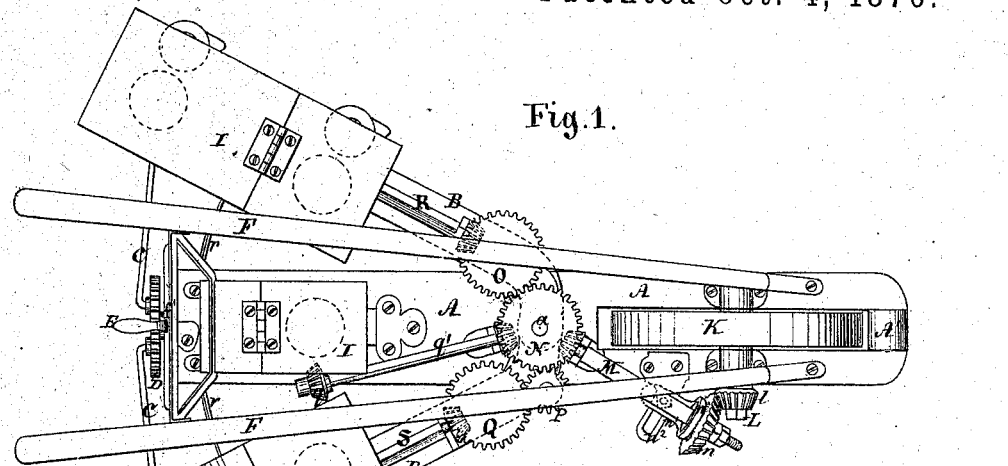
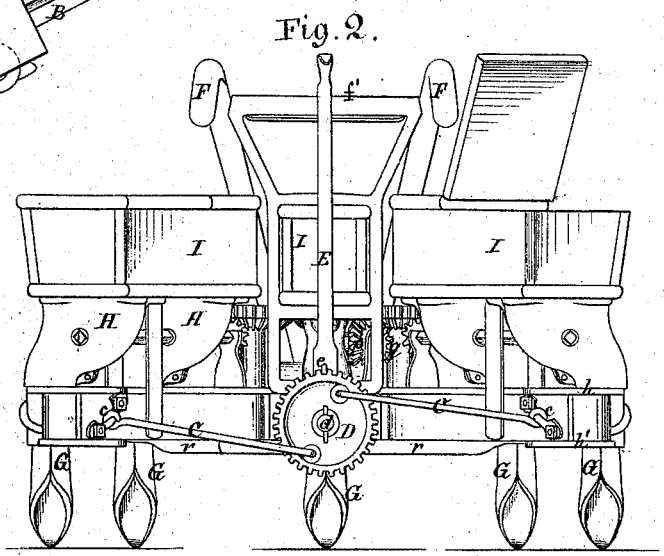
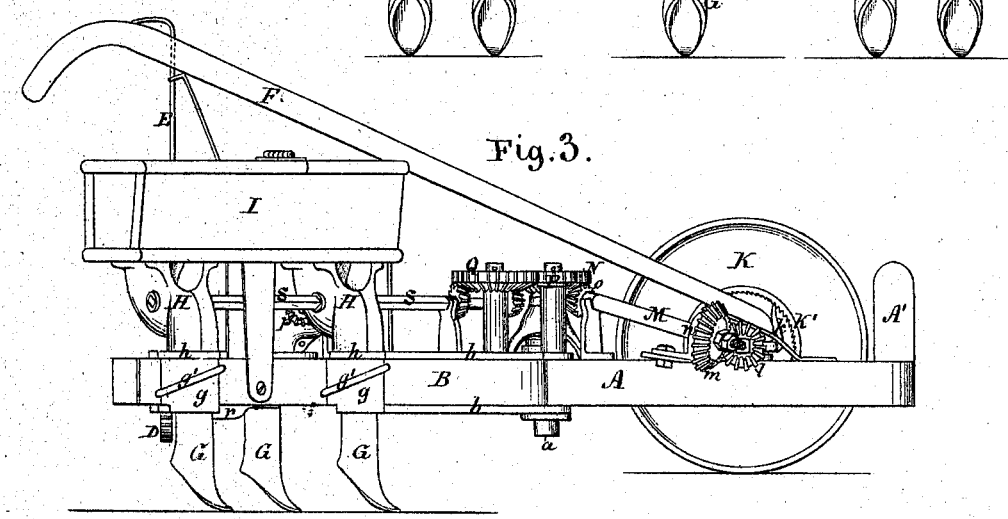

United States Patent Office.

JOSEPH INGELS, OF MILTON, INDIANA.

Letters Patent No. 107,915, dated October 4, 1870.

IMPROVEMENT IN GRAIN-DRILLS.

The Schedule referred to in these Letters Patent and making part of the same.

*To all whom it may concern:*

Be it known that I, JOSEPH INGELS, of Milton, in the county of Wayne and State of Indiana, have invented certain new and useful Improvements in Grain-Drills; and that the following is a full and exact description of the construction and operation of the same, reference being had to the accompanying drawing making a part of this specification, in which—

Figure 1 represents a top view of the grain-drill.
Figure 2 represents a rear view of the same.
Figure 3 represents a side view of the same.
Figure 4 represents a longitudinal vertical section through the grain-drill.
Figure 5 represents an adjustable sleeve-box and a bevel-gear wheel used on the machine.
Figure 6 represents a longitudinal vertical section through one of the concaves, grain-wheel, and drill-hoe of the machine.
Figure 7 represents a transverse vertical section through a concave and drill-hoe.
Figure 8 represents the lever used in widening and narrowing the machine.

Similar letters of reference, where they occur, denote like parts in all the figures.

This machine is mainly for the purpose of drilling wheat, barley, or oats between the rows of growing corn, and I style it a "one-horse drill."

My invention relates to the manner in which I have arranged and combined a ratchet and pawl with the ground-wheel, so that when the grain-drill is advancing, the ratchet drives the main shaft, and when it is backed at the end of the corn rows, it revolves loose upon the shaft, and ceases to feed the grain.

My invention further relates to the manner in which I have arranged the bevel-gear wheels on the main and driving-shafts, so that they can be used interchangeably to alter the speed of the grain-feeding wheels.

My invention further relates to the manner in which the sleeve-box is made adjustable to the frame where it operates in combination with a round or square shaft.

My invention further relates to the manner in which the gear-wheels are made with a projecting hub working into a sleeve-box, for the purpose of dispensing with a separate sleeve.

My invention further relates to the manner in which I have arranged three equal-sized, combined bevel, and straight gear-wheels, in combination with a small intermediate gear-wheel, for the purpose of rotating the shafts in opposite directions, so as to discharge the grain direct into the top of the hoe or tooth.

My invention further relates to the manner in which the drill-hoe or tooth is attached to the inside or outside of the frame, by means of a box with a clevis or bolt and two stay-plates, with a pin formed on either of them, or on the inside of the box, for the purpose of keeping the hoe in a fixed position.

My invention further relates to the manner in which the bottom of the chamber of the concave is made in the form of a socket around the top of the drill-hoe, so as to admit the grain directly into the hoe.

My invention further relates to the manner in which the converging branches of the frame are united together by a bolt passing through curved plates attached to them, so as to bring the pivoting point as near as possible to the center hoe, and to maintain the same relative position and distance between the hoes or teeth.

To enable others skilled in the art to make and use my invention, I will proceed to describe the same same with reference to the drawing.

The frame of the machine is composed of a horizontal beam, A, on each side of which the arms B are pivoted by means of the curved plates $b$, to which they are attached. These plates are united by the king-bolt $a$, which passes through them and through the beam A.

The angle formed by the arms B can be regulated by means of two connecting-rods, C, which have one end attached to each of the arms B at $c$, while the other end is connected with the ratchet-wheel D, pivoted at $d$ to the rear of the main beam A.

The ratchet-wheel D is operated by means of the lever E, carrying a pin, $e$, which engages with the teeth of the wheel D. This lever has a slot, $f$, cut in it, through which the shaft $d$ passes, allowing it to be raised and disengaged from the ratchet-wheel D, so as to take a new hold in revolving it.

The lever E is locked by entering it in a recess cut in the middle of the connecting-bar $f'$ of the handles F of the machine.

To each arm B are attached two tubular drill-hoes, G, by means of boxes $g$, each box being attached to the arms by a clevis or bolt, $g'$; the hoes are moreover held in position by the plates $h$ and $h^1$, the plates $h$ having a round hole, through which the upper portion of the hoe passes, while the plates $h^1$ have only a half-round opening, with a pin, $h^2$, projecting in the side of each hoe, to steady it and keep it from turning around.

The main beam A carries also a hoe, which is retained in position by similar plates $h$ and $h^1$.

H are concaves, which bring the grain from the boxes I to the drill-hoes. They are provided with the ordinary grain-wheels $i$, which regulate the delivery of the grain. The lower portion of each concave is made so as to form a socket for the hoe, admitting the grain directly into the hoe, while the body of the concave can be set at any desired angle with the curved point of the hoe.

The machine is supported at its front by a wheel, K, which gives motion to all the grain-wheels $i$, by means of the spring-pawl $k$ engaging with the ratchet-wheel K' attached to the wheel K. The pawl-carrying device $k'$ is made fast to the axle L, while the wheel K, not being fastened to the axle, can run loose on it in backing the machine, stopping thus the delivery of the grain.

When the machine is advancing, motion is transmitted from the axle L to the square shaft M by means of the bevel-gear wheel $l$, which meshes with the bevel-gear wheel $m$; these wheels, having a square opening of the same size, can be used interchangeably to vary the speed of the grain-wheels $i$ for different kinds of grain; they are also provided with a round projecting hub made to revolve in a sleeve-box, $n$, made adjustable to the frame by means of a slot, $n^1$, through which it is bolted to another slotted bracket, $n^2$, attached to the frame. In the full-size one-horse drill six different size gear-wheels are used, to accommodate different kinds of grain.

The shaft M carries also the bevel-gear wheel $o$, which engages with the combined bevel and square gear-wheel N, which meshes with the combined-bevel and square wheel O, and also the intermediate gear P, the gear P then engaging with the combined bevel and square gear-wheel Q. The shafts R and S are rotated in opposite directions, so as to discharge the grain direct into the top of the hoe.

The grain-wheel of the central concave is operated by the bevel-gear $p$ engaging with the bevel-gear $q$ on the shaft $q'$, thus allowing the concave to be placed parallel with the main frame, each shaft, R, S, and $q'$, being provided with bevel-gears which engage with the combined square and bevel-gears O, Q, and N.

To strengthen the frame, the arms B are further connected to the main beam A by the two curved bars, $r$, which pass through a guide, $s$, under the main beam.

In operating with this machine, a horse being attached to the upright A', the boxes I are filled with grain, and the width of the machine having been regulated by means of the lever E and ratchet-wheel D, the horse is started, and the hoes produce light furrows, into which the grain falls, immediately behind the point of the hoes, before the dirt can have an opportunity of crumbling again into the furrow, and the operation continues to the end of the row of corn, where the feeding of the grain will stop in backing the machine. The operation will then be repeated for every row until the work is accomplished. By placing the central hoe at or near the pivotal point $a$ of the arms B, and making the distance between them uniform on each arm, then, in expanding or contracting said arms, the rows will be of uniform distance, or very nearly so, from each other.

Though I have described this as a one-horse drill, yet it may be used in whole or in part as a two-horse drill, the devices not being restricted to the team.

Having thus fully described the construction and operation of this grain-drill,

What I claim therein as new, and desire to secure by Letters Patent, is—

1. In combination with a one-horse grain-drill, constructed as specified, the ground-wheel K and ratchet-wheel K', operating the mechanism by means of a spring-pawl, $k$, which ceases to operate in backing the machine, substantially as and for the purpose described.

2. In combination with a one-horse grain-drill, operated by a wheel, K, the bevel-gear wheels $l$ and $m$, when so constructed with a central square opening, that they can be used interchangeably on the main and driving-shaft of the machine, substantially as and for the purpose specified.

3. In combination with the round or square shaft M, used to drive the mechanism of a one-horse drill, the adjustable slotted sleeve-box and sleeve $n$, when supporting said shaft, substantially as and for the purpose set forth.

4. In combination with a grain-drill, in which interchangeable gears are used, and with the gear-wheels $l$ and $m$ operating as described, the projecting hub formed on them, so as to operate with an adjustable sleeve-box, $n$, and to dispense with a separate sleeve, substantially as specified.

5. In combination with a one-horse drill, the arrangement of the three equal-sized, combined bevel, and square gear-wheels, N O Q, with the small intermediate gear P, for the purpose of rotating the shafts in opposite directions, substantially as and for the purpose described.

6. In combination with the cylindrical hoe of a seed-drill, the box $g$, with clevis $g'$, and the plates $h$ and $h^1$, with pin $h^2$ attached to either of the plates $h\ h^1$, or to the box $g$, for the purpose of staying the hoe in a fixed position, substantially as and for the purpose set forth.

7. In combination with the cylindrical hoe of a grain-drill, the lower portion of the concave H, formed as a socket to receive the upper end of the hoe, so as to admit the grain directly into the hoe, substantially as and for the purpose described.

8. In combination with the main beam A and converging arms B of a one-horse grain-drill, the angular or curved plates $b$, placed above and under the frame, and united by the king-bolt $a$, so as to bring the pivot nearer to the central hoe, and the distances between the hoes nearly equal, substantially as described.

JOSEPH INGELS.

Witnesses:
GEORGE RARESHEID,
DAVID G. KERN.